(No Model.) 3 Sheets—Sheet 1.
J. W. ALLEN.
PLOW.

No. 357,443. Patented Feb. 8, 1887.

Witnesses:
Jas. E. Hutchinson
Henry C. Hazard

Inventor:
John W. Allen
by Priddle & Russell
his Attorneys (No Model.) 3 Sheets—Sheet 2.

J. W. ALLEN.
PLOW.

No. 357,443. Patented Feb. 8, 1887.

Witnesses:
Jas. E. Hutchinson
Henry C. Hazard

Inventor.
John W. Allen
by Prindle and Russell
his Attorneys (No Model.) 3 Sheets—Sheet 3.

J. W. ALLEN.
PLOW.

No. 357,443. Patented Feb. 8, 1887.

Witnesses:
Jas. E. Hutchinson.
Henry C. Hazard.

Inventor.
John W. Allen
by Prindle & Russell
his attorney

UNITED STATES PATENT OFFICE.

JOHN W. ALLEN, OF LENOIR, NORTH CAROLINA.

PLOW.

SPECIFICATION forming part of Letters Patent No. 357,443, dated February 8, 1887.

Application filed April 6, 1886. Serial No. 197,968. (No model.)

*To all whom it may concern:*

Be it known that I, JOHN W. ALLEN, of Lenoir, in the county of Caldwell, and in the State of North Carolina, have invented certain new and useful Improvements in Plows; and I do hereby declare that the following is a full, clear, and exact description thereof, reference being had to the accompanying drawings, in which—

Figure 1:
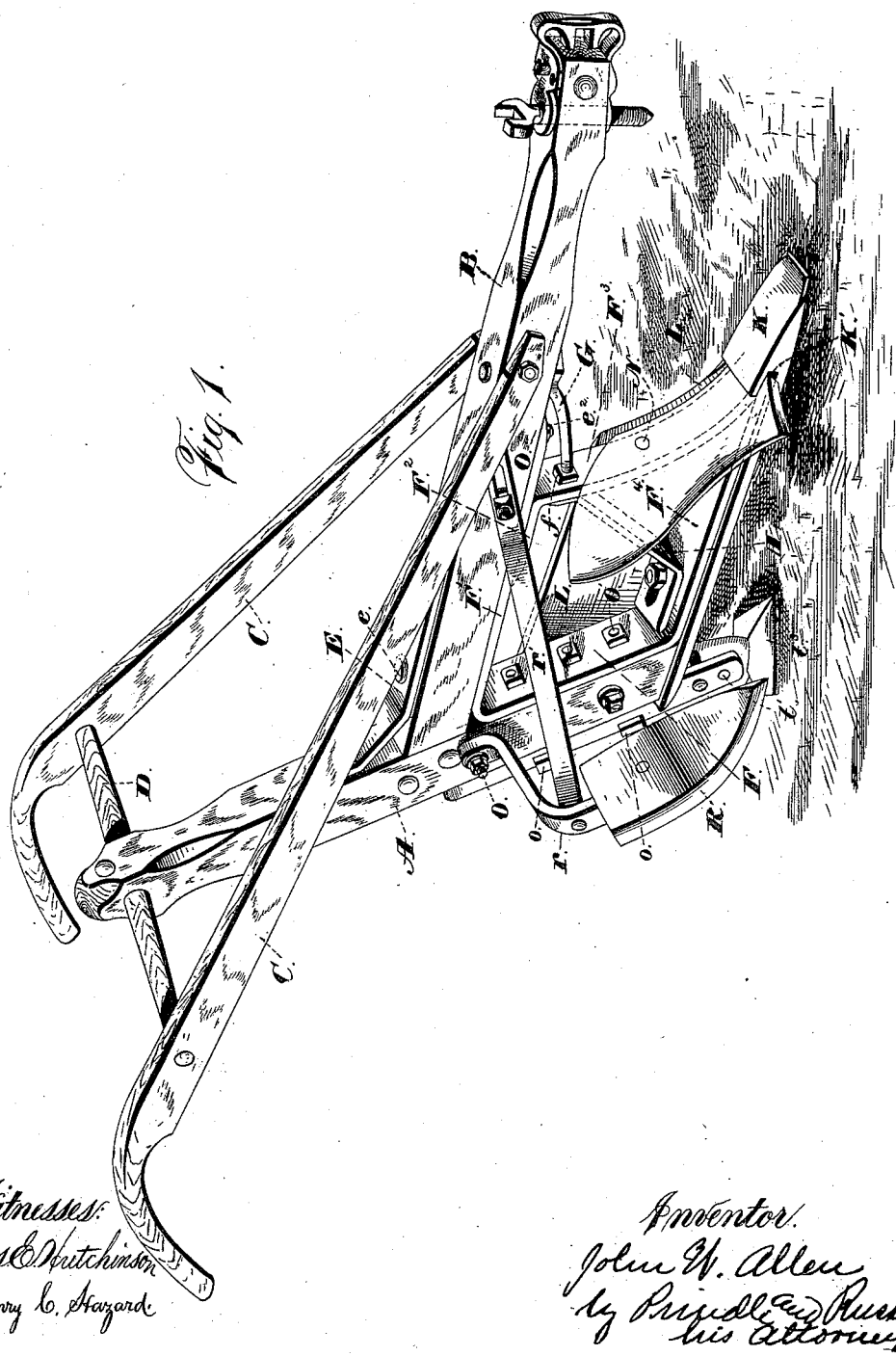
Figure 2:
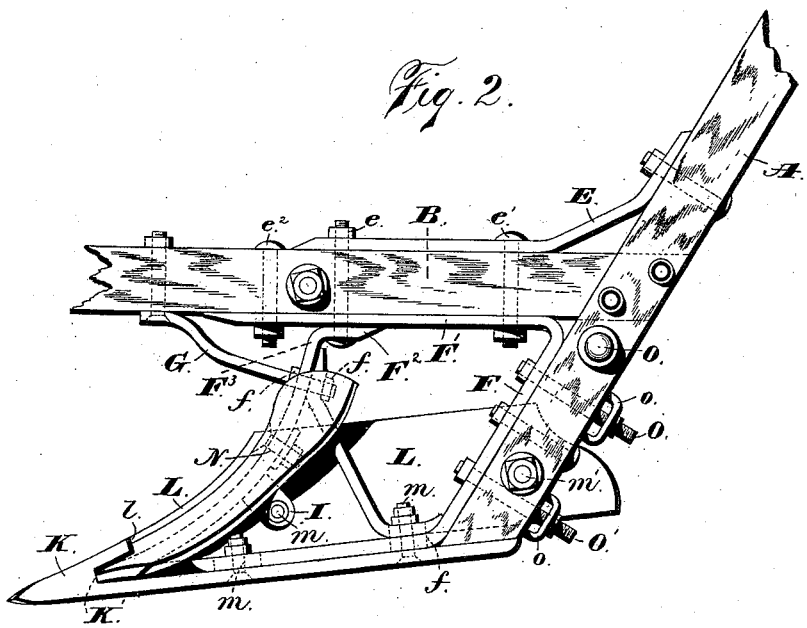
Figure 3:
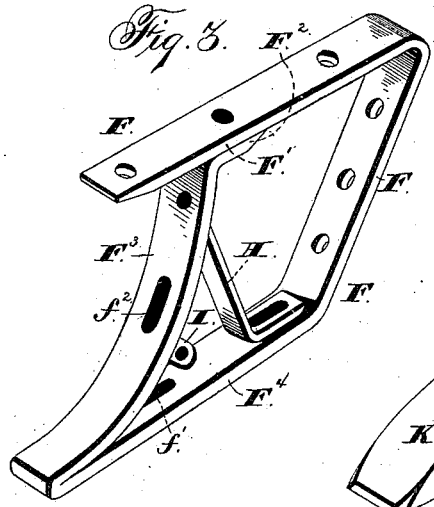
Figure 4:
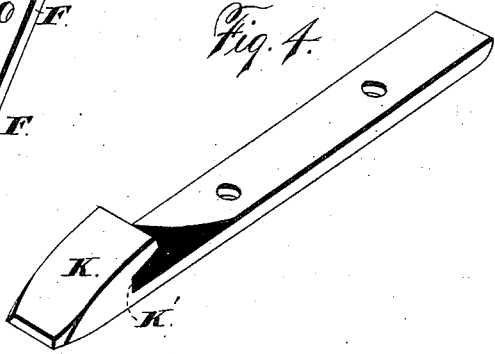
Figure 5:
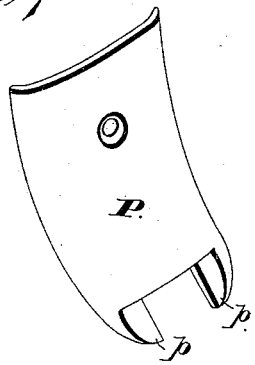
Figure 6:
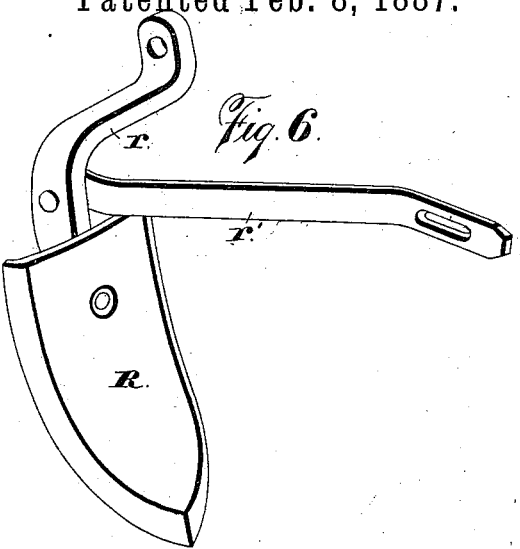

Figure 1 shows a perspective view of my improved plow arranged as a right-hand turning one and provided with a shovel and subsoil attachment; Fig. 2, a side view, but from the opposite, of my plow with the mold-board and shovel and subsoiler attachments removed and the landside in place, as when the plow is arranged as a left-hand turning one; Fig. 3, a detail view of the foot-piece or stock with point removed; Fig. 4, a similar view of the point detached; Figs. 5 to 10, inclusive, similar views of the various attachments to be used with my plow.

Letters of like name and kind indicate like parts in each of the figures.

The object of my invention is to provide an improved plow which shall be most strong, durable, and simple in construction, and easily and readily changed and adapted for various uses and purposes; and to this end my invention consists in the construction, arrangement, and combination of the parts and attachments of the plow, as hereinafter specified.

In the drawings, A designates the plow-standard, and B the beam, bolted at its rear end thereto. As usual, the handles C C are, at their forward ends, bolted or otherwise fastened to the beam, and near their rear ends are connected with the plow-standard A by means of the cross-bar D.

For the purpose of strengthening and stiffening the joint between the beam and standard, I prefer to provide the brace E, fastened on top of the beam and to the front of the standard, as shown in the drawings. The foot-piece F is also so shaped, as shown, as to act as a brace and stiffener for the beam and standard. It extends along rearward under the beam to the standard, then downward along the front side of the lower portion of the latter, then forward horizontally, then turns sharply and curves backward and upward to the under side of its upper horizontal portion, F', and then extends along rearward under such portion for a short distance.

Two bolts, $e$ and $e'$, serve to fasten brace E and the portion F' of the foot-piece to the beam. Of these bolts the latter passes down through the brace E, the beam, and the portion $F^2$ of the foot-piece, which extends rearward under portion F'. I prefer, also, to bolt the forward end of portion F' to the beam by a third bolt, $e^2$, though this is not necessary.

To the under side of beam B, forward of portion $F^2$ of the foot-piece, is fastened the forward end of brace G, whose rear end passes through the upright portion $F^3$ of the foot-piece, to which it is fastened by nuts $f f$, as shown. Between the part $F^3$ and the horizontal portion $F^4$ of the foot-piece is the brace H, fastened to part $F^3$ by the threaded portion of brace G passing through it. The lower horizontal part, $F^4$, of the foot-piece is provided with the two slots $f' f'$, for a purpose to be set forth hereinafter. The upright part $F^3$ is also slotted at $f^2$ to enable the fastening of the mold-board in place, and upon its rear side is provided with the lug I, having the opening $i$. The upright portion $F^3$ of the foot-piece is bolted, as shown, to the standard.

The plow-point K is made flat and with a sharp edge at its extreme front end. It is formed with the socket K', into which fits the front end of the foot-piece F. The point is, as shown, made wider than the foot-piece, so that on each side a portion of the socket K' remains unoccupied by the end or angle of the foot-piece.

The lower end of the mold-board L is, as shown, cut away to form a shoulder, $l$, to abut against the portion of the point above socket K', and extends forward and downward alongside of the foot-piece into the portion of socket K' unoccupied by the foot-piece angle or point. The upper portion of the mold-board is fastened to the part $F^3$ of the foot-piece by means of the bolt passing through the board and through the slot $f^2$. A washer and nut on the rear or inner end of the bolt serve to fasten the board firmly in place, and hold it with its shoulder $l$ abutting against the upper portion of the point and its extreme lower and forward portion in the socket K' alongside the point of the foot-piece. With such construction the mold-board will be most firmly and securely held against movement in any direction.

The lower portion of the point is extended as a fastening-shank, M, along under part $F^4$ of the foot-piece, and is fastened thereto by means of bolts $m$ $m$, passing up through it and slots $f'$ $f'$ in said part $F^4$. Each bolt is provided with a suitable washer and nut. The rear one of these bolts passes up through the lower rear end of brace $m$, and serves to fasten it to the foot-piece, as shown. The point-shank M not only extends along under part $F^4$ of the foot-piece, but also under the lower end of the standard, and throughout its length it is, like the point proper, made wider than the foot-piece, so as to project on each side thereof, so as to form a ledge to engage the lower edge of the landside M' on whichever side of the foot-piece it is placed. This landside consists, as shown in the drawings, of a plate whose front edge is adapted to project in front of the side of the mold-board when in position. It is made sharp, so as to cut the sod easily and cleanly. As seen in side elevation, the edge of this plate follows substantially the curve of the mold-board, and its lower front portion is shaped to project into and fit closely the portion of the socket in the plow-point alongside of the front of the foot-piece. On whichever side the landside is placed, it is fastened in place firmly by means of a bolt, $m$, passing through it and lug I on the foot-piece, with a nut on its inner end, and bolt $m'$ passing through it and the standard and provided with a suitable nut, or nut and washer. These bolts, together with the portion of the point-shank projecting beyond the side of the foot-piece, act to hold the plate most firmly and securely in place. The tongue on the plate, fitting in the socket in the point, also aids most materially in steadying and locking the plate in place.

With my foot-piece and point, as shown and described, either a right or left turning mold-board can be used, and the landside-plate put on the left or right side, accordingly. My plow can then be changed, as desired, quickly and readily from a right to left turning plow, or vice versa.

With my foot-piece, plow-point, and standard unchanged my plow can, by the attachment or interchange of certain pieces, be readily changed into an implement adapted for use for a number of different purposes.

For the ready attachment and removal of other pieces than the mold-board and landside I have provided a bolt, N, passing through the standard A near the point where the beam and standard are joined together, such bolt being of course provided with the usual nut, or nut and washer. Through the plow-beam another bolt, O, passes, long enough to project beyond both sides of the beam, and provided on opposite sides thereof with suitable nuts and washers. Through the standard A, below the beam, pass other bolts, O' O', having on their rear ends staple-like pieces $o$ $o$, held on by suitable nuts engaging them.

The method of changing my plow from a right-hand to a left-hand turning one has already been indicated, so I will go on to describe the other possible changes. To make a common shovel-plow, the mold-board and landside are removed, and the center or straight shovel, P, (shown in Fig. 5,) is bolted to the upright $F^3$ of the foot-piece, with its two tongues, $p$ $p$, fitting into the socket K' in the plow-point on each side of the foot-piece point.

Figure 7:
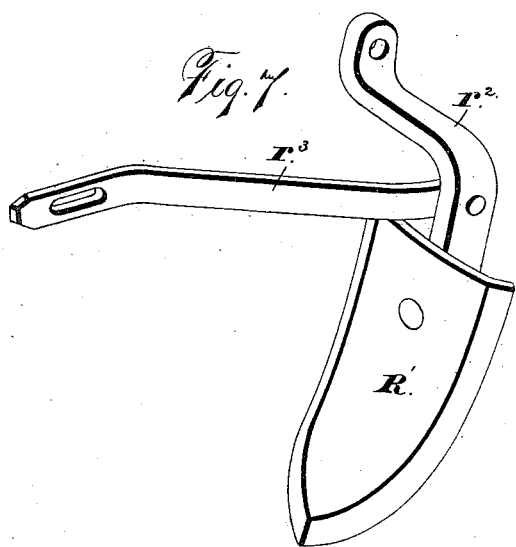

To make a right-hand double-shovel plow, take the right-hand side shovel, R, (shown in Fig. 6,) and fasten its arm $r$ to the plow-standard by means of bolt N and its brace $r'$ to the beam by means of bolt O. To change the plow now to a left-hand double-shovel, I detach shovel R and attach on the other side, but in a precisely similar way to that described above, the left-hand side shovel, R', as shown in Fig. 7, with its arm $r^2$ and brace $r^3$.

To turn the plow into a cultivator, both right and left hand side shovels and the center shovel are used together.

If desired, while the mold-board and landside, whether left or right hand, are in place, a corresponding side shovel can be attached, so as to have a right or left hand turning-plow with side shovel, which can be used most advantageously where close plowing to corn, cotton, and other crops planted in rows is desired.

Figure 8:
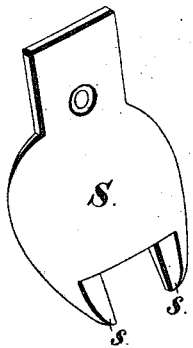
Figure 9:
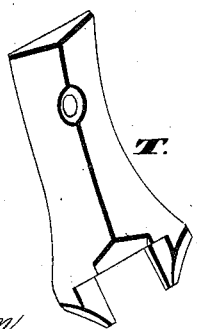
Figure 10:
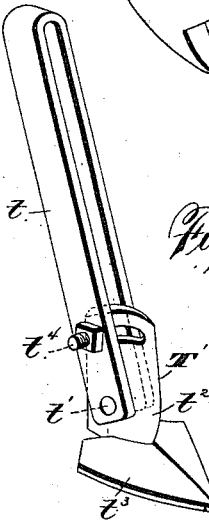

If a bull-tongue plow is desired, the mold-board, landside, and side shovel being removed, the bull-tongue mold-board S, as shown in Fig. 8, is bolted to the foot-piece, with its projections $s$ $s$ fitting into the sockets on each side of the foot-piece point.

To make a simple subsoiler, remove the bull-tongue mold-board and substitute the front subsoiler, T, (shown in Fig. 9,) therefor.

For a double subsoiler the rear subsoiler, T', (shown in Fig. 10,) is used at the same time with the front subsoiler referred to above. This rear subsoiler, as shown, consists of the forked or slotted shank $t$, adapted to embrace bolts O' O' on the rear side of the standard, and to be in turn embraced and held by the staple-shaped pieces $o$ $o$. Pivoted on pin $t'$ at the lower end of this shank is the arm $t^2$, on the sharp triangular foot $t^3$. The upper portion of arm $t^2$ is slotted, and the bolt $t^4$ passes through shank $t$ and such slot. With this construction the foot or point $t^3$ can obviously be easily adjusted to the desired angle with reference to the shank by loosening the bolt $t^4$, swinging the foot or point on its pivot, and then tightening up the bolt again. This rear subsoil attachment can be used in connection with any of the other attachments described.

My plow-point, as described, preferably made of steel, is of the greatest simplicity, and is durable and easily removable from the foot-piece or stock. As it is not connected with any of the mold-boards or attachments to be used on the plow, they can be removed, replaced, and interchanged at will without disturbing, loosening, or removing the point.

The landside used by me, with its projecting cutting-edge can, as indicated, be used equally well on either side of the plow in connection with either the right or left hand turning mold-board.

As the rear subsoiler and one of the side shovels can be used in connection with either the right or left hand turning mold-board and the landside correspondingly arranged, I have shown the plow in Fig. 1 with such attachments in place for use.

Having thus fully set forth the nature and merits of my invention, what I claim is—

1. In a plow, in combination with the stock or foot-piece, the point made broader than the front end of the foot-piece, so as to project beyond both sides of the same, and provided with a recess or socket into which the end of the stock fits, substantially as and for the purpose described.

2. In combination with the plow-point provided with the socket K' and with the rearwardly-extending shank, the foot-piece made narrower than the point and its shank and having its front end fitting into the socket in the point, substantially as set forth and described.

3. In a plow, in combination with the stock or foot-piece, a landside adapted to be attached to either side of the same, substantially as shown and described.

4. In combination with the foot-piece or stock and the plow-point fastened thereto and having a socket at the side of the foot-piece, the landside consisting of a plate having a tongue projecting into the socket in the plow-point and its forward edge above such tongue made sharp and projecting in front of the face of the mold-board, substantially as and for the purpose described.

5. In combination with the stock or foot-piece and the point fastened thereto having a socket on each side of the foot-piece, the landside adapted to be fastened on either side of the stock, as desired, and having a tongue adapted to fit either of the sockets in the point, and means for fastening the landside to the foot-piece, substantially as set forth and described.

6. In combination with the foot-piece or stock having the rearwardly-extending portion, the point attached to the foot-piece, having a socket at one side of the latter and a shank extending along under the rearwardly-extending portion of the foot-piece and projecting beyond the side of the same, and the landside-plate resting at its lower edge upon the projecting portion of the shank and at its front end provided with a tongue fitting the socket in the point, substantially as described and shown.

7. In combination with the foot-piece or stock having the rearwardly-extending lower portion, $F^4$, the point fitting over the front end of the foot-piece and having a socket on each side of such piece and a shank extending along under and made wider than the portion $F^4$ of the foot-piece, suitable bolts for fastening the shank to the foot-piece, a mold-board fitting at its front end into one of the sockets in the point, a bolt fastening the board to the foot-piece, the landside-plate having a tongue to fit in the other socket, and means for fastening such plate to the foot-piece, substantially as set forth, for the purpose specified.

8. In combination with the slotted or forked shank carrying the subsoiler-foot, the bolts on the standard and the staple-shaped pieces on the bolts embracing the shank and the nuts on the bolts engaging such pieces, substantially as and for the purposes described.

9. In combination with the plow-standard, the slotted or forked shank, the bolts on the standard engaged by such forked shank, the staple-like pieces on the bolts engaging the shank, and the foot having an arm between and pivoted to the lower ends of the shank sides, substantially as and for the purpose shown.

10. The foot-piece or stock for a plow, consisting of a bar of iron having the straight portion for attachment to the plow-beam, then bent downward to form the portion for attachment to the plow-standard, then extending forward, then bent backward and upward, and then bent rearward under the upper beam portion, substantially as and for the purpose described.

11. In combination with the plow-beam and the foot-piece, the brace H, extending from the front of the foot-piece to the lower side thereof, the brace G, extending from the beam through the front of the foot-piece and the upper end of the brace H, and two nuts on brace G, one engaging the rear side of the brace H and the other the front face of the foot-piece, substantially as and for the purpose described.

In testimony that I claim the foregoing I have hereunto set my hand this 7th day of January, A. D. 1886.

JOHN W. ALLEN.

Witnesses:
  R. A. COLEMAN,
  W. D. CLARKE.